Patented Sept. 10, 1935

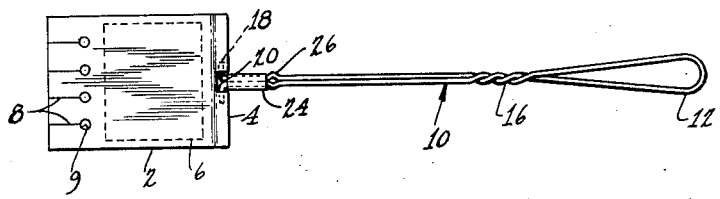
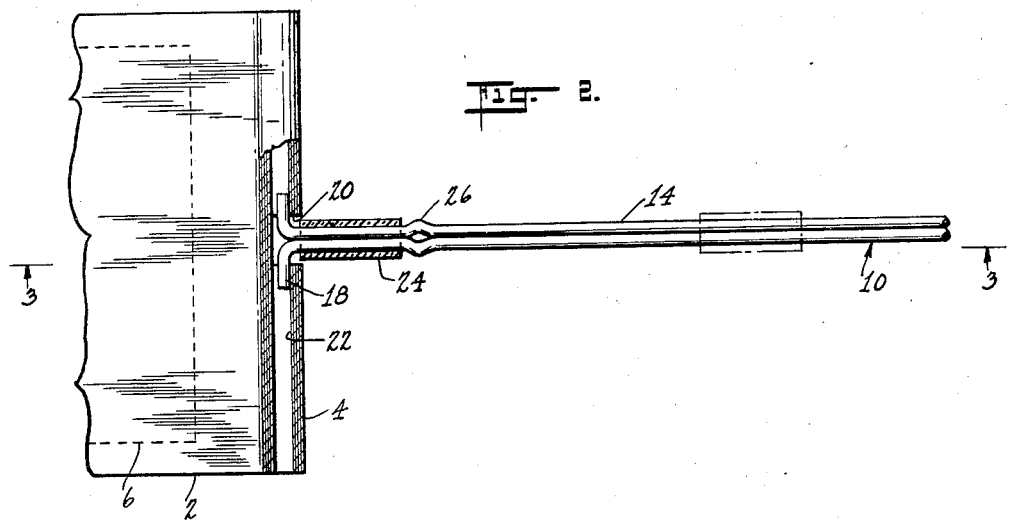
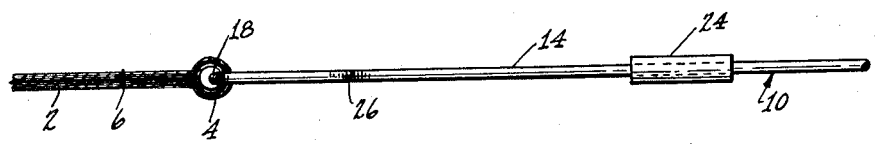
Sebastian P. Neuhausen
INVENTOR

2,014,027

UNITED STATES PATENT OFFICE 2,014,027

INSECT SWATTER

Sebastian P. Neuhausen, Lombard, Ill.

Application April 24, 1933, Serial No. 667,520
Renewed February 5, 1935

3 Claims. (Cl. 43—137)

My invention relates to devices for killing insects, such as flies, and includes among its objects and advantages an improved and simplified construction for detachably connecting the flap portion of the swatter with the handle portion thereof, and for preventing the marring of articles with which the flap portion may come into contact.

In the accompanying drawing:

Figure 1 is a plan view of a device constructed in accordance with the invention;

Figure 2 is an enlarged detail view of a portion of the device in Figure 1, showing the structure for detachably connecting the flap portion with the handle portion; and Figure 3 is a sectional view taken substantially along the line 3—3 of Figure 2.

In the embodiment selected to illustrate my invention, I make use of a flap portion or striker portion 2 which may be substantially rectangular in shape and provided with a looped end portion or handle-retaining means 4. The striker portion has been illustrated as comprising a plurality of sheets of material, such as paper, disposed in superimposed relationship, and looped at their mid portions for providing the loop portion or handle-retaining portion 4. The sheets of material preferably are sewed together, as at 6 to permit the removal of the outer sheets when the same become soiled, or they may be secured together by any other suitable means, such as glue.

The other end of the striker or flap portion 2 may be provided with slits 8 terminating in perforations or openings 9.

A handle 10 is provided for being detachably connected with the striker portion, and has been illustrated as comprising a piece of material, such as heavy gauge wire of desired resiliency, and looped at its mid portion for providing a handle portion 12 and a pair of substantially parallel extending portions 14. The extending portions 14 may be mutually wound, as at 16, for being secured together. The extending portions 14 are substantially equal in length, and are provided with transversely and oppositely extending end portions 18.

The looped end portion of the striker portion 2 may be cut out, as at 20, for receiving the extending portions 14, whereby the transversely extending end portions 18 may be disposed in the passageways 22 provided by the looped end portion 4, for connecting the handle with the striker portion.

A retaining element or band 24, which may be constructed of resilient or elastic material, such as a piece of rubber tubing, may be disposed on the extending portions 14 for retaining the extending portions and the transversely extending end portions in their positions shown in Figures 1 and 2, whereby the striker portion may be retained in operable connection with the handle.

The extending portions 14 may be formed for providing offset portions 26 for normally retaining the band 24 in the position shown in Figures 1 and 2, whereby the handle may be retained in connection with the striker or flap portion.

When it is desired to disconnect the handle from the striker portion, the band 24 is moved over the offset portions 26 to a position remote therefrom, as illustrated in Figures 2 and 3. The extending portions may then be moved toward and by each other until the transverse end portions 18 are positioned side by side and within the cut-out portion or opening 20 of the looped end portion 4, at which time the handle may be removed from the striker portion 2.

In the same manner, the handle may be connected with the striker portion.

Thus it will be seen that when the striker portion becomes soiled or deteriorated through use, it may be detached from the handle and replaced by a new one.

It will also be noted that the striker portion is swingably or pivotally connected with the handle, the advantage of which is that the striker portion may be positioned flat on an object, regardless of the angle at which the handle is positioned with respect to the object, thereby minimizing the possibility of an insect escaping when it is positioned on the object and struck at with the swatter portion.

I claim:

1. An insect swatter comprising a striker formed of a plurality of superposed sheets of paper folded intermediate the ends and attached together to form a transverse passage, the folded end of the striker having an opening therein communicating with said passage, and a handle having oppositely directed members adapted to be passed through said opening into engagement with said passage for swingingly connecting the same to the handle.

2. A fly swatter comprising a striker formed of a plurality of superposed sheets of paper folded intermediate the ends to form a transverse passage and stitched together to enable the removal of the outer sheets when soiled, said folded end of the striker having an opening therein communicating with said passage, a handle formed of wire with the ends thereof oppositely directed and adapted to be passed through said opening into said passage for engaging the inner portion of said folded end of the striker for swingingly connecting the same to said handle, and a sliding sleeve on said handle for restraining accidental displacement of said ends from said passage.

3. An insect swatter comprising a striker formed of a plurality of superposed flexible sheets folded intermediate the ends and attached together to form a transverse passage, the folded ends of said sheets having an opening therein communicating with said passage, a handle of flexible wire having oppositely directed ends adapted to be passed through said opening into said passage for detachably connecting the handle to the striker, and a member slidable on said handle to a position adjacent said ends to restrain relative movement of the same and prevent accidental displacement thereof from said passage.

SEBASTIAN P. NEUHAUSEN.